United States Patent [19]
Kishi

[11] Patent Number: 5,492,872
[45] Date of Patent: Feb. 20, 1996

[54] CERAMIC MIRRORS AND METHOD OF MANUFACTURING SAME

[75] Inventor: Yukio Kishi, Funabashi, Japan

[73] Assignee: Nihon Cement Co., Ltd., Tokyo, Japan

[21] Appl. No.: 283,666

[22] PCT Filed: Oct. 1, 1992

[86] PCT No.: PCT/JP92/01268

§ 371 Date: May 20, 1993

§ 102(e) Date: May 20, 1993

[87] PCT Pub. No.: WO93/07516

PCT Pub. Date: Apr. 15, 1993

Related U.S. Application Data

[63] Continuation of Ser. No. 64,044, May 20, 1993, abandoned.

[30] Foreign Application Priority Data

Oct. 2, 1991 [JP] Japan ..................... 3-255101

[51] Int. Cl.$^6$ ............................ C04B 35/46; B29D 11/00
[52] U.S. Cl. ............................ 501/134; 264/65; 264/66; 264/1.21
[58] Field of Search .................... 501/134; 264/1.21, 264/65, 66

[56] References Cited

U.S. PATENT DOCUMENTS

| | | | |
|---|---|---|---|
| 3,459,503 | 8/1969 | Roy et al. | 501/134 |
| 3,615,759 | 10/1971 | Busdiecker et al. | 501/7 |
| 3,639,132 | 1/1972 | Egerton et al. | 501/134 |
| 4,492,669 | 9/1988 | Gould | 419/5 |
| 5,071,596 | 12/1991 | Goela et al. | 264/1.2 |

FOREIGN PATENT DOCUMENTS

| | | |
|---|---|---|
| 58-33101 | 7/1983 | Japan . |
| 58-33099 | 7/1983 | Japan . |
| 63-88503 | 4/1988 | Japan . |
| 63-88502 | 4/1988 | Japan . |

OTHER PUBLICATIONS

Review of Scientific Instruments, vol. 61, No. 2, Feb. 1990, pp. 728–731.
Journal of Optics, vol. 20, No. 5, Oct. 1989, pp. 219–223.
NTIS Tech Notes, Sep. 1989, pp. 728.
Applied Optics, vol. 19, No. 20, Oct. 15, 1980, pp. 3562–3584.

*Primary Examiner*—Mark L. Bell
*Assistant Examiner*—Michael Marcheschi
*Attorney, Agent, or Firm*—Jacobson, Price, Holman & Stern

[57] ABSTRACT

A ceramic mirror having a maximum surface flatness of 1 μm and/or a maximum centerline average height of 1 nm as measured by the laser interference method, and a method of manufacturing a ceramic mirror by compacting a titanium oxide powder having an average particle diameter no greater than 1 μm and a purity of at least 99% and then sintering the compact in an ordinary, inert, vacuum, or reducing atmosphere at a temperature between 1000° and 1300° C. The sintering pressure may be a minimum of 50 kg/cm$^2$. After sintering, the product may be further treated by hot isostatic pressing (HIP) in an Ar atmosphere at 1000° C. and a pressure of 1800 kg/cm$^2$. The sintered bodies are then surface ground or lapped to produce ceramic mirrors having the above characteristics for use in laser and X-ray apparatuses, cameras, and other precision optical instruments.

7 Claims, No Drawings

CERAMIC MIRRORS AND METHOD OF MANUFACTURING SAME

This is a continuation of application Ser. No. 08/064,044, filed May 20, 1993, which was abandoned upon the filing hereof.

BACKGROUND OF THE INVENTION

This invention relates to ceramic mirrors for use in laser and X-ray apparatuses, cameras, and other precision optical instruments and the like and also to a method of manufacturing the mirrors.

Mirrors for use with precision optical instruments and the like are predominantly made of glass, ruby, sapphire and the like, and also of single crystal ceramics. In recent years alumina and SiC have partly come in use as polycrystalline ceramics.

Glass-based mirrors are made relatively thick to make up for the inadequate strength and fragility, and therefore the heavy weight and large size of the mirrors as a whole have been a problem. Polycrystalline alumina, SiC, and other ceramic materials are used in the form of sintered bodies after grinding and lapping. None of them have proved fully satisfactory in respect of the properties such as surface smoothness and optical properties, because the pores inherent to the ceramic materials remain exposed on the lapped surfaces.

BRIEF SUMMARY OF THE INVENTION

It is an object of the invention to provide a mirror having excellent surface smoothness with fewer pores than heretofore known and having superior optical properties due to lower irregular reflection of light.

The present inventor, in an effort to solve these problems, sintered a high-purity, fine titanium oxide powder at a relatively low temperature. This has been found to give a mirror having excellent surface smoothness with a smaller number of pores than before and having superior optical properties due to less irregular reflection of light. The discovery has led to the perfection of the present invention.

The invention resides, in essence, in a ceramic mirror characterized by a surface flatness of no more than 1 μm and/or a centerline average height of no more than 1 nm as measured by the laser interference method, and also in a method of manufacturing a ceramic mirror characterized by the steps of compacting a titanium oxide powder having an average particle diameter of no more than 1 μm and a purity of at least 99% and sintering the compact in an ordinary, inert, vacuum, or reducing atmosphere at a temperature between 1000° and 1300° C.

DETAILED DESCRIPTION

The invention will now be described in detail.

In accordance with the invention a fine titanium oxide powder of high purity is used as a material and is sintered at a lower temperature than the usual sintering temperatures to obtain a sintered body with excellent surface smoothness, inhibiting the particle growth and preventing the pore size increase while achieving an adequate sintered density.

The reason why a ceramic mirror having outstanding characteristics can be obtained by the aforesaid method is theoretically to be clarified yet. Possibly the low temperature sintering of a fine titanium oxide powder keeps the pores within the crystal grains (a phenomenon known as "ghosting"), suppressing the accumulation and growth to a grain boundary phase.

The expression "a lower temperature than the usual sintering temperatures" as used herein means a temperature range from 1000° to 1300° C. If the temperature is below 1000° C. the sintering itself does not proceed. A temperature above 1300° C., on the other hand, causes rapid grain growth and therefore a decrease in mechanical strength and pore migration and growth to a grain boundary phase. Consequent reduction of surface smoothness and irregular reflection of light renders it impossible to obtain a mirror of satisfactory optical characteristics.

If the material powder is not at least 99% pure titanium oxide or has a larger average particle diameter than 1 μm, it is no longer easily sinterable at low temperatures. Sintering in the temperature range of 1000° to 1300° C. will not give a product with an adequate sintered density.

For this reason it is desirable that the titanium oxide powder have a purity of at least 99%, preferably at least 99.8%, and an average particle diameter of no more than 1 μm, preferably no more than 0.5 μm.

The titanium oxide powder is compacted by CIP (cold isostatic pressing), mechanical pressing, doctor blade method, extrusion, or other technique depending on the configuration of the product. Whatever compacting technique is chosen, an organic binder or the like suited for the particular method is used as a compacting assistant. The compact thus obtained is sintered in air, vacuum, or an atmosphere of $N_2$, Ar, $H_2$ or the like, at sintering temperatures in the optimum range of 1000° to 1300° C. Where greater surface smoothness is required, the compact is hot press sintered under a pressure of at least 50 kg/cm$^2$. Such a sintered body is further treated by hot isostatic pressing (HIP) under a pressure of not less than 500 kg/cm$^2$.

The $TiO_2$ sintered body so obtained is machined, e.g., by surface grinding or lapping, to a mirror for use in a laser or X-ray apparatus, camera, or other precision optical instrument. When necessary, the mirror is coated with a metal of high reflectivity so as to be a mirror for a precision optical application.

Such a ceramic mirror has a surface flatness of no more than 1 μm and/or a centerline average height of no more than 1 nm. Moreover, the amount of its irregular reflection of incident light measured with a colorimeter is 5% or less. If the characteristic values exceed the numerical values specified above, too much irregular reflection will result, making the optical characteristics inadequate for a mirror.

BEST MODE FOR CARRYING OUT THE INVENTION

Examples 1 to 4 of the present invention and Comparative Examples 5 to 8 are given below.

Example 1

To a titanium oxide powder having an average particle diameter of 0.25 μm and a purity of 99.8% ("CR-EL" (trade name), a product of Ishihara Sangyo Kaisha) was added 2% polyvinyl alcohol (PVA) as a compacting assistant. After mixing in a mortar and drying, the mixture was sieved for particle size regulation.

The mixture was compacted by CIP at a pressure not lower than 1000 kg/cm$^2$ and sintered at ordinary pressure in air at 1200° C. The sintered body so obtained was lapped, and its surface flatness and amount of irregular reflection were measured. The results are given in Table 1.

Table 1.

TABLE 1

| Sample No. | TiO$_2$ powder Purity (%) | TiO$_2$ powder Aver. part. dia. (μm) | Sintering condition | Surface flatness (μm) | Center-line aver. height (nm) | Amount of irregular reflection (%) |
|---|---|---|---|---|---|---|
| Example (1) | 99.8 | 0.25 | Sintered at ordinary pressure in air at 1200° C. | 0.9 | 0.8 | 4 |
| (2) | " | " | Sintered at ordinary pressure in Ar at 1100° C. | 0.8 | 0.7 | 3 |
| (3) | " | " | Hot press sintered in N$_2$ at 1000° C. | 0.4 | 0.5 | 2 |
| (4) | " | " | After sintering in air at 1200° C., HIP'd in Ar at 1000° C. and 1800 kg/cm$^2$ | 0.2 | 0.3 | 1 |
| Comp. Ex (5) | 96.0 | 0.25 | Sintered at ordinary pressure in air at 1200° C. | 1.8 | 3.2 | 10 |
| (6) | " | " | Sample 5 sintered in air at 1000° C. and HIP'd at 1800 kg/cm$^2$ | 1.4 | 2.7 | 8 |
| (7) | 99.5 | 1.5 | Sintered at ordinary pressure in air at 1200° C. | 2.4 | 6.5 | 15 |
| (8) | " | " | Sample 7 sintered at 1000° C. and HIP'd at 1800 kg/cm$^2$ | 2.0 | 4.1 | 13 |

Example 2

The titanium oxide powder of Example 1 was used. Following compacting, it was sintered in an Ar atmosphere at 1100° C. The properties of the sintered body after lapping are shown at (2) in Table 1.

Example 3

Using the titanium oxide powder of Example 1, hot press sintering was performed in a N$_2$ atmosphere at 1000° C. and at a pressure of 200 kg/cm$^2$. The sintered body after lapping exhibited properties as shown in Table 1.

Example 4

The sintered body obtained in Example 1 was treated by HIP in an Ar atmosphere at 1000° C. and at a pressure of 1800 kg/cm$^2$. Table 1 gives the properties of the sintered body as lapped.

Comparative Example 5

Sample No. 5 was obtained by following the same procedure as described in Example 1 with the exception that a titanium oxide powder having an average particle diameter of 0.25 μm and a purity of 96.0% was employed instead. The properties of the sintered body after lapping are shown in Table 1.

Comparative Example 6

Sample No. 5 was compacted and sintered in air at 1000° C. and at ordinary pressure and then treated by HIP under the conditions given in Example 4 to obtain Sample No. 6. The sintered body upon grinding showed properties as in Table 1.

Comparative Example 7

Except for the use of a titanium oxide powder having an average particle diameter of 1.5 μm and a purity of 99.5%, the procedure of Example 1 was repeated, when Sample No. 7 was obtained. The sintered body properties after grinding are given in Table 1.

Comparative Example 8

Sample No. 7 was sintered in air at 1000° C. and at ordinary pressure and treated by HIP under the conditions of Example 4 to obtain Sample No. 8. Table 1 shows the sintered body properties after grinding.

Industrial Applicability

As described above, sintering a high-purity, minute titanium oxide powder at a low temperature below the usual sintering temperature range makes ghosting of pores in the resulting sintered body possible. In this way titanium oxide sintered parts have been obtained which exhibit high enough surface smoothness and optical characteristics for mirrors to be used in laser and X-ray apparatuses, cameras, and other precision optical instruments.

I claim:

1. A method for manufacturing a ceramic mirror comprising:

compacting a titanium oxide powder having an average particle diameter no greater than 0.5 μm and a minimum purity of 99.8%;

sintering said compacted titanium oxide powder to produce a ceramic body at ordinary pressure and a temperature between 1000° C. and 1300° C. in air; and machining said ceramic body by surface grinding and lapping to produce a ceramic mirror having a maximum mirror surface flatness of 1 μm as measured by a laser interference method.

2. A method for manufacturing a ceramic mirror comprising:

compacting a titanium oxide powder having an average particle diameter no greater than 0.5 μm and a minimum purity of 99.8%;

sintering said compacted titanium oxide powder to produce a ceramic body at ordinary pressure and a temperature between 1000° C. and 1300° C. in air; and machining said ceramic body by surface grinding and lapping to produce a ceramic mirror having a mirror surface with a centerline average height no greater than 1 μm as measured by a laser interference method.

3. A method for manufacturing a ceramic mirror as claimed in claim 1 wherein said machining further comprises:

producing a ceramic mirror having a mirror surface with a centerline average height no greater than 1 nm as measured by a laser interference method.

4. The method as claimed in claim 1 and further comprising:

hot isostatic pressing said ceramic body after said sintering at a temperature between 800° C. and 1500° C. under a minimum pressure of 500 kg/cm$^2$.

5. The method as claimed in claim 1 wherein:

said compacting comprises cold isostatic pressing at a minimum pressure of 1000 kg/cm$^2$; and said sintering temperature is 1200° C.

6. The method as claimed in claim 1 wherein:

said sintering temperature is 1100° C.

7. The method as claimed in claim 4 wherein:

said hot isostatic pressing is in an argone atmosphere at a temperature of 1000° C. and a pressure of 1800 kg/cm$^2$.

* * * * *